March 13, 1962 G. E. FRANCK 3,025,084
FITTING FOR SEAMED TUBING
Filed Feb. 10, 1956
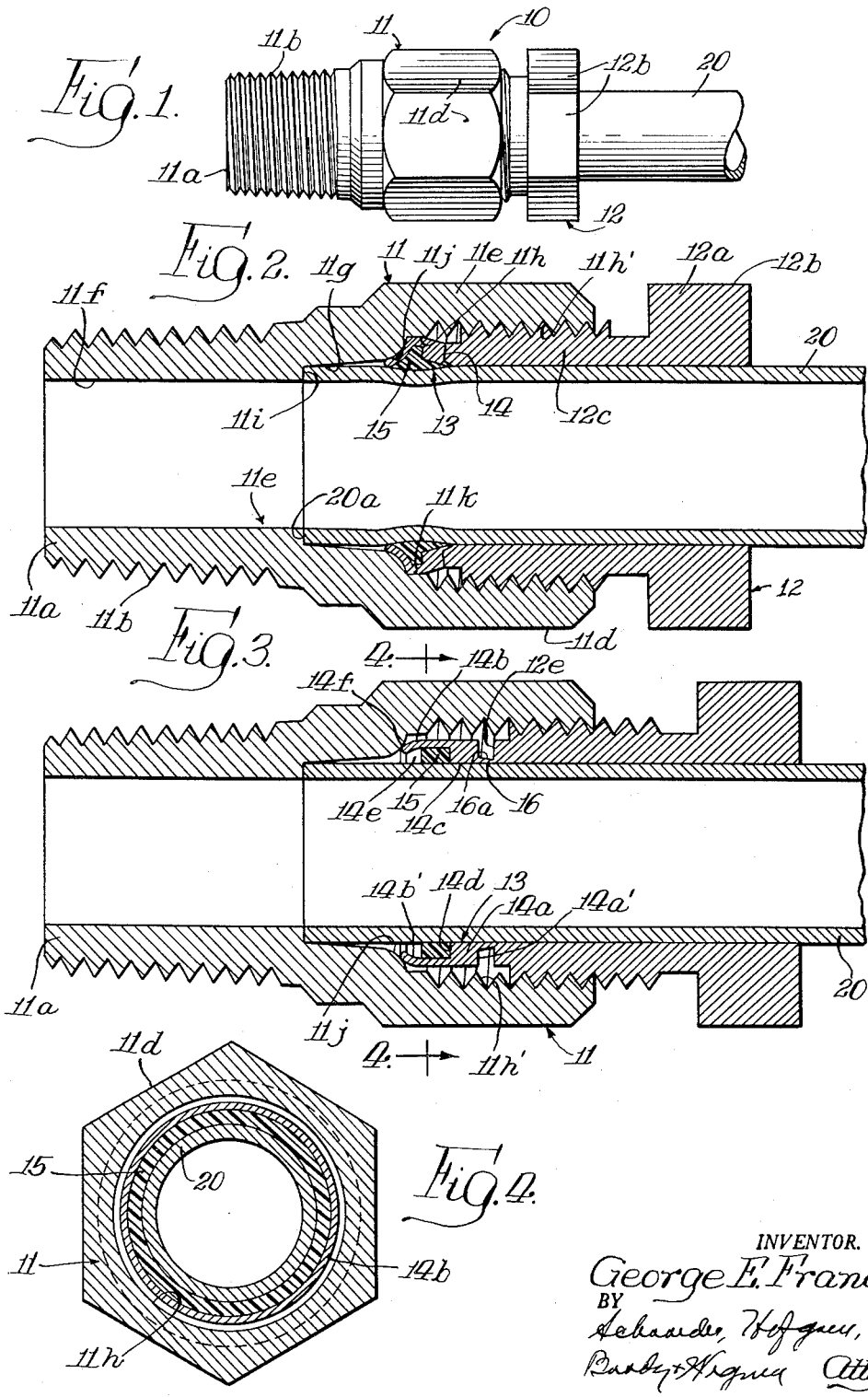
INVENTOR.
George E. Franck.

United States Patent Office 3,025,084
Patented Mar. 13, 1962

3,025,084
FITTING FOR SEAMED TUBING
George E. Franck, Riverside, Ill., assignor to Imperial-Eastman Corporation, a corporation of Illinois
Filed Feb. 10, 1956, Ser. No. 564,726
3 Claims. (Cl. 285—93)

This invention relates to a tube fitting and in particular to a fitting for use with a tube having an irregular periphery.

In connecting a tube having an irregular periphery, such as seamed tubing, it has been found that the conventional fitting utilizing a constrictable metallic sleeve frequently fails to provide a perfectly tight seal. This is due to the inability of the metallic member to engage intimately all portions of the tube wall where a substantial deviation from the truly circular shape of the constrictable member is had in the tube periphery. To the end of assuring the necessary seal in such fittings additional elements such as washers and gaskets are employed. It has been found, however, that in the devices now known in the art such washers often become permanently deformed precluding reuse of the fitting and frequently fail to provide the necessary sealing intended.

The principal object of this invention is to provide a new and improved fitting for use with tubing having an irregular periphery.

Another object is to provide such a fitting having a new and improved constrictable member and a new and improved plastic member arranged to co-act with the constrictable member to connect mechanically and sealingly the fitting to the tube.

A further object of the invention is to provide a fitting having a constrictable sleeve adapted to be permanently secured to the tube and plastic sealing means surrounded by the sleeve and forced thereby into sealing engagement with the tube.

A still further object of the invention is to provide a fitting with a constrictable, tubular sleeve which is adapted to be deformed radially outwardly and radially inwardly and an annular plastic member carried within said sleeve and deformable radially outwardly and radially inwardly by the action of said sleeve to be forced into sealing engagement with said sleeve and the tube.

Still another feature is that the plastic member is comprised of a polyamide whereby cold flow and setting thereof are effectively minimized while suitable resiliency for vibration accommodation is provided.

Other features and advantages of this invention will be apparent from the following description taken in connection with the accompanying drawings wherein:

FIGURE 1 is an elevational view of a fitting embodying the invention secured to the end of a tube;

FIGURE 2 is an enlarged diametrical sectional view thereof;

FIGURE 3 is an enlarged diametrical sectional view similar to FIGURE 2 but with the elements shown as arranged before attachment of the fitting to the tube; and FIGURE 4 is a sectional view taken approximately along the line 4—4 of FIGURE 3.

In the exemplary embodiment of the invention as disclosed in the drawings a fitting generally designated 10 is shown to be secured to one end of a tube 20. Fitting 10 comprises a generally tubular body member 11, a generally tubular nut member 12 and an annular means generally designated 13 for securing and sealing the members 11 and 12 to the tube 20. Means 13 comprises a generally tubular, constrictable sleeve 14 and an annular plastic member 15 carried by sleeve 14. As illustratively disclosed in the drawings, sleeve 14 may be originally secured to nut member 12 by a frangible connection 16.

The coaction between members 11 and 12 and means 13 during installation of fitting 10 on tube 20 is such that sleeve 14 is disconnected from nut member 12 and forcibly constricted onto tube 20, with plastic member 15 being surrounded by sleeve 14 and urged, under substantial pressure, into tight sealing engagement with the tube and the sleeve. A second sealing engagement is had between sleeve 14 and body member 11, thereby completing the sealing connection of the fitting to the tube. As the engagement is readily separable between the body member and the sleeve, even though a permanent connection results between annular means 13 and tube 20, repeated connections and disconnections of fitting 10 to tube 20 may be made without affecting the soundness of the connection.

Body member 11 is preferably formed of a relatively rigid material such as brass, aluminum, steel, or certain of the plastics, and is provided with an inner end 11a having means, such as external threaded portion 11b, for attachment of the body member to an element such as a fitting. The outer end 11c of body member 11 is provided with a plurality of flat surfaces 11d for coaction with a tool such as a wrench. Extending completely through body member 11 is a passage 11e comprising inner end 11f, mid-portion 11g, and outer end 11h which is threaded over an outer portion 11h'. The diameter of passage end 11f is made comparable to the internal diameter of tube 20, the diameter of passage mid-portion 11g is made approximately equal to the external diameter of the tube, and the diameter of passage outer end 11h is made substantially greater than the external diameter of the tube. A radially extending shoulder 11i is provided between mid-portion 11g and inner end 11f and a guide surface 11j is provided between mid-portion 11g and outer end 11h, which surface is preferably rounded so as to flare radially and axially inwardly or toward inner end 11f. To assist in guiding the end 20a of tube 20 into proper positioning within body member 11 passage mid-portion 11g is made slightly frusto-conical, narrowing toward inner end 11f. Between guide surface 11j and the threaded portion 11h' passage outer end 11h is provided with a longitudinally extending cylindrical surface 11k.

Nut member 12 may be formed of a material similar to that comprising body member 11 and is provided with an outer end 12a having a plurality of peripheral tool engaging surfaces 12b adapted for co-action with a tool such as a wrench for manipulation of the nut member during connection or disconnection of the fitting. The inner end 12c of nut member 12 is exteriorly threaded for engagement with the threaded portion 11h' of body member 11. Extending completely through nut member 12 is cylindrical bore 12d which preferably has a diameter comparable to or just slightly greater than the external diameter of tube 20 to allow the insertion of the tube therethrough while maintaining a snug fit of member 12 therearound.

As shown in FIGURE 3 annular means 13 may be originally secured to nut member inner end 12c by a frangible connection 16. Connection 16 comprises a radially thin ring having a frusto-conical outer surface 16a narrowing axially outwardly. The external diameter of connection 16 at the point where it joins nut member inner end 12c is made substantially less than the external diameter of end 12c, thus resulting in a radial end surface 12e.

Sleeve 14 is formed of a deformable material such as brass and is preferably formed integrally with nut member 12 and frangible connection 16. The sleeve comprises a generally tubular member having a base or outer end 14a and an inner end 14b. Base 14a is joined to frangible connection 16 at a radially extending surface 14a' at the outer end of the base. The internal diameter of base 14a is made comparable to the external diameter of tube 20, and the internal diameter of end 14b is made substantially greater than the external diameter of tube 20, thus providing a stepped bore 14c completely through the sleeve. At the inner end of base 14a is a radially extending shoulder 14d which forms the longitudinally outward boundary of an annular space 14e extending between the outer periphery of tube 20 and the radially inner surface 14b' of sleeve end 14b. The inner tip 14f of sleeve end 14b is arranged to bear against guide surface 11j prior to the connecting operation, as best seen in FIGURE 3.

Plastic member 15 preferably comprises an annular member composed of a deformable plastic such as polyamide plastic, one example thereof being nylon (a polyamide resin made by the polymerization of a hexaethylenediamine salt of adipic acid). The internal diameter thereof is made comparable to the external diameter of tube 20 to allow ready reception of the tube therein during assembly, the external diameter is made slightly less than the diameter of sleeve surface 14b' to effect a frictional retention of member 15 in sleeve space 14e, and the axial length is made substantially equal to the axial length of sleeve end 14b between tip 14f and shoulder 14d, thereby allowing the reception of member 15 fully within the longitudinal outer portion of sleeve space 14e and in abutment with shoulder 14d. While the frictional retention of member 15 in space 14e is normally sufficient, inner tip 14f of the sleeve may be formed radially inwardly in the preferred embodiment as best seen in FIG. 3, positively to retain member 15 in space 14e.

Having described a typical structure embodying my invention, I will now describe the use thereof. To install fitting 10 on the end of tube 20, nut member 12 and annular means 13 secured thereto by frangible connection 16 are first placed over the end of the tube, outer end 12a foremost. The end of tube 20 and body member 11 are moved relatively so as to position tube end 20a against radial shoulder 11i in body member passage 11e. Nut member 12 is then moved axially inwardly on tube 20 so as to move means 13 through passage outer end 11h until the tip 14f of sleeve 14 abuts guide surface 11j.

Further forcible advancement of nut member 12, by threading it into the threaded portion 11h' of body member 11, effects a fracture of the frangible connection 16. As nut member radial surface 12e is moved longitudinally inwardly, it forces frangible connection 16 radially inwardly as it bears against surface 16a. Upon abutment of surfaces 12e and 14a', further inward movement of the nut member positively forces the sleeve tip 14f against guide surface 11j, causing sleeve inner end 14b to be deformed radially and axially inwardly so as to conform to the guide surface 11g. This deformation or constriction continues until inner tip 14f abuts the outer surface of tube 20. As inward movement of tube 20 is prevented by abutment of tube end 20a with shoulder 11i, the tube is held firmly during this constricting operation. As best seen in FIGURE 2, the end portions of sleeve 14 are constricted radially inwardly, while concurrently the intermediate portion of the sleeve is forced radially outwardly into abutment with surface 11k. This causes sleeve 14 to have a generally U-shaped cross section and to enclose plastic member 15 radially outwardly and laterally while forcibly pressing it into intimate sealing engagement with tube 20. The polyamide composition of member 15 provides effectively minimized cold flow and setting and desirable resilience whereby the proper intimate engagement is maintained.

When the sleeve intermediate portion fully abuts surface 11k, a "hit home" condition results wherein the effectively positive limitation of movement is felt by the operator and acts to indicate that the fitting has been properly assembled with no further tightening being necessary. Without such a "hit home" effect, the operator would be unable to tell when the proper force or sealing means 13 has been applied and could overstress the sealing means 13. It should be noted, however, that sufficient force has been developed prior to this "hit home" condition to constrict radially inwardly the portion of tube 20 immediately subjacent annular means 13, thereby more effectively locking means 13 onto the tube. To the same end the frusto-conical shape of frangible connection 16 causes it to act as a wedge-like member and jam itself tightly against the outer surface of tube 20 and prevent subsequent axially outward movement of means 13.

During the deforming or constricting operation of sleeve 14, the inner portion of base 14a is forced somewhat away from tube 20 and plastic member 15 is pressed into the resultant space. As seen in FIG. 2, this effects an increase in the lateral area of engagement between plastic member 15 and tube 20 and an improved seal is obtained.

In disconnecting tube 20 from body member 11 nut member 12 is simply withdrawn by a reverse threading operation until it is disengaged from threaded portion 11h' of body member 11. Annular means 13 is now permanently secured to tube 20 and remains locked thereon. Separation between tube 20 and body member 11 may now be readily effected by relative axial movement therebetween so as to withdraw the tube end from passage outer end 11h. Subsequent connection of tube 20, with annular means 13 secured thereon, may now be made to the same body member 11 or to any other similar body member as desired, with the new connection being effected by the re-sealing of sleeve 14 to the body member, the seal between sleeve 14 and tube 20 being permanent.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A fitting for use with a tube having an irregular periphery comprising a body member having a passage therethrough with an outwardly opening enlarged terminal portion adapted to receive freely an end of a tube including a flared guide surface at the inner end of the terminal portion and an adjacent cylindrical surface, said cylindrical surface being of a diameter no greater than any surface of the terminal portion outwardly thereof, an annular deformable sleeve slidable over a tube end inserted into said enlarged terminal portion, said sleeve having an outside diameter less than the diameter of said cylindrical surface and a stepped internal diameter, the portion of the sleeve having the larger internal diameter being of a length such that when the end thereof is deformed into contact with a tube inserted therethrough a portion thereof remains radially opposite said cylindrical surface, annular plastic means within the portion of the sleeve having the larger internal diameter adapted to surround a tube inserted through said sleeve, and pressure means threadedly associated with said body member and operatively associated with said sleeve for urging the outer end of the sleeve radially inwardly to abut the tube and forcing the inner end of said sleeve against said guide surface, said guide surface being arranged to deform the sleeve inner end radially inwardly to abut the tube for radially outwardly and laterally longitudinally enclosing said plastic means and pressing it sealingly against the tube, said parts being proportioned to deform the mid-portion of the sleeve radially outwardly into abutment with said cylindrical surface to give a feel indication that assembly of the fitting is complete.

2. The fitting of claim 1 wherein the sleeve includes a base portion having a radially inner and longitudinally outer edge provided with an annular wedge means tapering longitudinally outwardly.

3. The fitting of claim 1 wherein said sleeve at its outer end and said pressure means at its inner end have means including an annular surface on each said sleeve and said pressure means forming a large angle with the axis of said sleeve and said pressure means respectively, and in the non-made-up condition of the fitting spaced slightly from one another, cooperating when the fitting is tightened to make up the joint to tilt the base portion of said sleeve in a direction to aid bowing of the deformable portion radially outwardly into contact with the cylindrical surface of said body member, said annular surfaces abutting each other as the fitting is tightened to limit the tilting of said base portion.

References Cited in the file of this patent

UNITED STATES PATENTS

| | | |
|---|---|---|
| 1,983,840 | Dohner | Dec. 11, 1934 |
| 2,252,554 | Carothers | Aug. 12, 1941 |
| 2,258,528 | Wurzburger | Oct. 7, 1941 |
| 2,544,109 | Richardson | Mar. 6, 1951 |
| 2,561,648 | Bradley | July 24, 1951 |

FOREIGN PATENTS

| | | |
|---|---|---|
| 915,008 | France | July 8, 1946 |